United States Patent Office 3,354,047
Patented Nov. 21, 1967

3,354,047
PROCESS FOR THE RECOVERY OF HYDRO-
CARBON FERMENTATION PRODUCTS
Donald O. Hitzman, Bartlesville, Okla., assignor to
Phillips Petroleum Company, a corporation of Delaware
No Drawing. Filed July 26, 1963, Ser. No. 297,940
6 Claims. (Cl. 195—28)

ABSTRACT OF THE DISCLOSURE

Hydrocarbon fermentation products are concentrated from a fermented mixture having as components microorganisms, a suitable aqueous mineral salt cultural solution for the microorganisms, a paraffinic hydrocarbon in the range from methane to hexadecane, inclusive, and the fermentation products, by only cooling the mixture to freeze and crystallize the component having the highest freezing point and filtering out the resulting crystals. This process can be repeated with the filtrate if necessary. A valuable result is that the microorganisms are not killed by the freezing, as they would be by concentration by boiling and evaporating to form crystals in the prior art, and therefore may be used in further fermentations at a great savings in cost of culturing the fermenting solutions.

---

This invention relates to a process for the recovery of hydrocarbon fermentation products. In another aspect, this invention relates to a process for the recovery and separation of hydrocarbon fermentation products wherein the hydocarbon fermentation mixture is cooled so as to crystallize and separate therefrom unreacted hydrocarbon and/or fermentation products.

It is known in the art that hydrocarbons can be fermented by microorganisms with the production of hydrocarbon-soluble products and/or water-soluble products. A difficulty frequently associated in fermentations of this nature is the lack of a rapid economical method to recover these fermentation products or to remove the unreacted hydrocarbon from the aqueous phase to thus lessen the problems of recovery of the water-soluble products.

Accordingly, an object of my invention is to provide a process for the recovery of unreacted hydrocarbon and/or fermentation products from fermentation mixtures.

Another object of my invention is to provide for the recovery of unreacted hydrocarbon and/or products from fermentation reaction mixtures by crystallization.

Other objects, advantages and features of my invention will be readily apparent to those skilled in the art from the following description and the appended claims.

Broadly, I have discovered that in hydrocarbon fermentation processes unreacted hydrocarbons and/or products can be separated from the reaction mixture by cooling the fermentation mixture so as to selectively crystallize reactants and/or products which can then be separated readily by mechanical means.

In a hydrocarbon fermentation process, hydrocarbon-utilizing microorganisms are placed in an aqueous mineral salts medium. Hydrocarbon-utilizing microorganisms include yeast, molds, algae and bacteria. Suitable bacteria include Eubacteriales, Actinomycetales, Chlamydobacteriales, Myxobacteriales, and Spirochaetales. The microorganisms are cultured in various mixtures of mineral salts dissolved in distilled water and with a hydrocarbon as the carbon source. Generally, a suitable aqueous medium should have (a) a balanced mineral content, (b) a nitrogen source such as ammonium or nitrate ions, (c) oxygen, and (d) a pH near neutrality. Exceptions are known to each of these conditions. Attention is directed to Petroleum Microbiology by Beerstecher, Elsevier Press, Inc., 1954, for a more complete discussion of suitable media.

The hydrocarbon employed in the fermentation process may be gaseous, liquid or solid at the fermentation temperature. The "fermentation mixture" as herein employed comprises a hydrocarbon, aqueous medium and hydrocarbon-utilizing microorganisms.

In the hydrocarbon fermentation process, the selected hydrocarbon-utilizing microorganisms are placed in a suitable aqueous medium. When a gaseous hydrocarbon is utilized, the hydrocarbon can be circulated through the aqueous medium. When a normally liquid hydrocarbon is utilized, the hydrocarbon can be placed on the surface of the aqueous medium, forming a hydrocarbon-aqueous medium interface.

Temperatures employed in the fermentation process normally range from about 20° C. to about 50° C., although temperatures outside this range can be employed. Generally, fermentation processes are conducted at about 37° C.

Products of the fermentation process include acids, alcohols, ketones, esters and aldehydes. For example, paraffin hydrocarbons are converted to alcohols, aldehydes, ketones, acids, and ester waxes. Methanol, formaldehyde, and formic acid are produced from methane by *Methanomonas methanooxidans* and *Pseudomonas methanica*. The fermentation products are normally distributed in both the hydrocarbon phase and the aqueous medium, with the concentration in the respective phases depending upon the particular fermentation products produced and their specific distribution coefficients.

In accordance with my invention, the fermentation mixture is cooled after fermentation or conversion of the hydrocarbons has been effected so as to selectively crystallize or freeze reactants and/or products, which then can be separated from the fermentation mixture by mechanical means. The temperature of the fermentation mixture can be reduced or lowered to within one degree of the freezing point of the aqueous medium, maintaining the aqueous medium in the liquid phase.

The unreacted hydrocarbon, separated from the fermentation mixture by crystallization and containing microorganisms, can be returned to the fermentation mixture after separation of the fermentation products from the hydrocarbon phase and aqueous medium.

When the hydrocarbon utilized in the fermentation process has a melting point above the freezing point of the aqueous medium and below the fermentation temperature, the temperature of the fermentation mixture can be lowered after fermentation has been effected until the unreacted hydrocarbon is solidified. The solidified hydrocarbon is readily separable from the fermentation mixture by mechanical means such as filtration or the like. The fermentation products can then be separated from the hydrocarbon phase and from the aqueous medium by conventional methods such as fractionation and solvent extraction.

When the hydrocarbon utilized in the fermentation process has a melting point below the freezing point of the aqueous medium, the temperature of the fermentation mixture after fermentation has been effected can be lowered so as to solidify the fermentation products from the fermentation mixture having freeze points above the freeze point of the aqueous medium.

It is also within the scope of this invention to separate unreacted hydrocarbon and fermentation products from fermentation mixtures wherein both the hydrocarbon and the fermentation products have freezing points above the freezing point of the aqueous medium by lowering the temperature of the fermentation mixture to the freezing point of the highest melting component (unreacted hydrocarbon or fermentation product), separating the solidified material, reducing or lowering the temperature to the temperature of the second or remaining crystallizable component (unreacted hydrocarbon or fermentation product), and separating the second crystallizable component therefrom.

Following the cooling of the fermentation mixture and separation of the crystallizable component, it may be desirable in some instances to raise the temperature of the aqueous medium containing fermentation products to kill and autolyze the cells, thereby causing some fermentation products to be released from the microorganisms. The fermentation products can then be separated by conventional procedures from the aqueous medium.

The fermentation process and recovery of fermentation products from the fermentation mixture can be made continuous. For example, a hydrocarbon wax can be emulsified in the aqueous medium. During the course of the fermentation process, a side stream can be continuously removed from the fermentation zone and permitted to flow across a chilled plate. The unreacted hydrocarbon wax solidifies, whereas the fermentation products, such as acids, alcohols, ketones or esters, will remain dissolved in the aqueous solution, from which they can be separated by conventional methods as heretofore described. The solid unreacted hydrocarbon wax can be readily separated by physical methods such as filtration or skimming and if desired, the unreacted wax covered with microorganisms preserved by the cold temperature can then be returned to the fermentation zone. Thus, the unreacted hydrocarbon wax is not only separated from the fermentation process and recovered, but it also carries the microorganisms which inoculate the fermentation zone aqueous medium again.

The following examples are presented as illustrative of the invention. It is not intended that the invention should be limited thereto.

EXAMPLE I

An aqueous mineral salt solution containing 2.0 grams per liter $KH_2PO_4$, 4.0 grams per liter $K_2HPO_4$, 0.2 gram per liter $MgSO_4 \cdot 7H_2O$, 0.001 gram per liter $MnCl_2 \cdot 4H_2O$, 0.005 gram per liter $FeSO_4 \cdot 7H_2O$, 0.1 gram per liter $CaCl_2$, and 1.0 gram per liter $(NH_4)_2SO_4$ is prepared. A culture of the microorganisms of the Micrococcus species is placed in 500 ml. of the aqueous mineral salt solution and permitted to grow, with agitation and in the presence of air, on 5 grams of kerosene at 37° C. for a period of 3 days. The fermentation mixture is then cooled to 1° C. Separation of the cooled mixture yields 0.5 gram of solid ester waxes typified by hexadecyl stearate. The filtrate comprising aqueous medium, microorganisms, and unreacted kerosene is returned to the fermentation vessel.

EXAMPLE II

A culture of microorganisms of the Pseudomonas species in 500 ml. of the aqueous mineral salt solution of Example I is permitted to grow, with agitation and in the presence of air, on 5 grams of hexadecane at 37° C. for three days. The fermentation mixture is then cooled to 5° C. and filtered, whereupon glutamic acid, a product of the fermentation, passes into the filtrate in the form of a salt and is subsequently recovered by a conventional separation method. The solid unreacted hexadecane which is filtered off, together with adhering microorganisms, weighs 3.5 grams. This unreacted hydrocarbon is returned to the fermentation process for further utilization.

As will be evident to those skilled in the art, various modifications of this invention can be made, or followed, in the light of the foregoing disclosure, without departing from the spirit or scope thereof.

I claim:
1. The process of producing hydrocarbon fermentation products selected from the group consisting of acids, alcohols, ketones, esters and aldehydes which comprises the steps of:
    mixing hydrocarbon utilizing microorganisms selected from the group consisting of yeasts, molds, algae and bacteria with an aqueous mineral salt solution suitable for the culture of the selected microorganisms and about 10 grams per liter of a paraffinic hydrocarbon in the range of methane to hexadecane, inclusive;
    fermenting the mixture at a temperature of 20 to 50° C. for a time sufficient to produce said fermentation products in a recoverable yield;
    the mixture then comprising as separable components fermentation products, unreacted hydrocarbon, and aqueous salt solution;
    concentrating said fermentation products by freezing the one of said components which has the highest freezing point by only lowering the temperature until that component has crystallized;
    filtering out said resulting crystals; and
    reusing the aqueous salt solution containing some of the live microorganisms for further fermentation.
2. In the process of claim 1 when the fermentation products component is removed in the filtrate along with one of said other 2 components, the process of only further cooling said filtrate until and thereby causing one of the two remaining components to crystallize and then filtering out said resulting crystals.
3. In the process of claim 1 when the fermentation products component is removed as crystals along with crystals of another component, the process of then only raising the temperature of the removed crystals and thereby causing thawing of one of the two components therein, and separating these two components by filtration.
4. In the process of claim 1 when the fermentation products component is removed as crystals, the process of only further cooling and thereby causing the filtrate to crystallize one of the remaining components and then filtering out said resulting crystals.
5. The process of claim 1 in which the hydrocarbon is kerosene and the fermentation product comprises hexadecyl stearate.
6. The process of claim 1 in which the hydrocarbon is hexadecane and the fermentation product comprises glutamic acid.

References Cited

UNITED STATES PATENTS 3,057,784  10/1962  Davis et al. _____ 195—28
3,205,150   9/1965  Spencer et al. _____ 195— 3 X
3,222,258  12/1965  Iizuka et al. _____ 195—3 X

OTHER REFERENCES

Morton, "Laboratory Technique in Organic Chemistry," 1938, pp. 147 to 151 and 163–164.

A. LOUIS MONACELL, *Primary Examiner.*
JOSEPH P. BRUST, L. M. SHAPIRO,
*Assistant Examiners.*